(12) United States Patent
Wijesundara et al.

(10) Patent No.: US 11,304,476 B2
(45) Date of Patent: Apr. 19, 2022

(54) VARIABLE STIFFNESS APPARATUSES USING AN INTERCONNECTED DUAL LAYER FLUID-FILLED CELL ARRAY

(71) Applicant: THE BOARD OF REGENTS OF THE UNIVERSITY OF TEXAS SYSTEM, Austin, TX (US)

(72) Inventors: Muthu B. J. Wijesundara, Austin, TX (US); Wei Carrigan, Austin, TX (US); Mahdi Haghshenas-Jaryani, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 127 days.

(21) Appl. No.: 16/465,928

(22) PCT Filed: Dec. 1, 2017

(86) PCT No.: PCT/US2017/064218
§ 371 (c)(1),
(2) Date: May 31, 2019

(87) PCT Pub. No.: WO2018/102684
PCT Pub. Date: Jun. 7, 2018

(65) Prior Publication Data
US 2020/0221821 A1     Jul. 16, 2020

Related U.S. Application Data

(60) Provisional application No. 62/428,613, filed on Dec. 1, 2016.

(51) Int. Cl.
*A43B 13/18*     (2006.01)
*A43B 17/03*     (2006.01)
(Continued)

(52) U.S. Cl.
CPC ............ *A43B 13/189* (2013.01); *A43B 17/03* (2013.01); *B32B 3/085* (2013.01); *A47C 27/085* (2013.01); *Y10T 428/24331* (2015.01)

(58) Field of Classification Search
CPC ....... A43B 13/189; A43B 17/03; A43B 13/20; A43B 13/182; A43B 17/02; B32B 3/085;
(Continued)

(56) References Cited

U.S. PATENT DOCUMENTS 3,068,494 A * 12/1962 Pinkwater ............ A47C 27/081
                                                        5/708
3,283,799 A     11/1966   Barbera
(Continued)

FOREIGN PATENT DOCUMENTS

KR     2007/0090474     9/2007
WO    WO/15/191007     12/2015

OTHER PUBLICATIONS

Aubin et al., "A pediatric robotic thumb exoskeleton for at-home rehabilitation : The isolated orthosis for thumb actuation (IOTA).", International Journal of Intelligent Computing and Cybernetics 7(3), 2014.
(Continued)

*Primary Examiner* — David Sample
*Assistant Examiner* — Donald M Flores, Jr.
(74) *Attorney, Agent, or Firm* — Meunier Carlin & Curfman LLC

(57) ABSTRACT

Variable stiffness apparatuses using an interconnected dual layer fluid-filled cell array. One example of the present apparatuses comprises: a substrate having a first side and a second side; and a plurality of structures coupled to the substrate, where each structure comprises: a flexible first portion having a first end, a second end, and a sidewall extending between the first end and the second end, the first
(Continued)

portion defining a first chamber; and a second portion having a first end, a second end, and a sidewall extending between the first end and the second end, the second portion defining a second chamber in fluid communication with the first chamber; where each of the plurality of structures is coupled to the substrate such that the first portion is disposed on the first side of the substrate, and the second chamber is disposed on the first side or the second side of the substrate.

16 Claims, 14 Drawing Sheets

(51) Int. Cl.
  *B32B 3/08* (2006.01)
  *A47C 27/08* (2006.01)
(58) Field of Classification Search
  CPC .......... Y10T 428/24331; A47C 27/085; A47C 7/144; A47C 23/002; A47C 27/08; A47C 27/081; B60N 2/643; B60N 2/646; A61G 5/1043
  See application file for complete search history.

(56) References Cited

U.S. PATENT DOCUMENTS

| | | | |
|---|---|---|---|
| 3,538,628 A | 11/1970 | Einstein | |
| 3,574,386 A | 4/1971 | Frost | |
| 3,834,046 A | 9/1974 | Fowler | |
| 5,156,629 A | 10/1992 | Shane et al. | |
| 5,237,501 A | 8/1993 | Gusakov | |
| 5,267,365 A | 12/1993 | Walter | |
| 5,423,094 A * | 6/1995 | Arsenault | A47C 4/54 297/DIG. 3 |
| 5,881,407 A | 3/1999 | Chu Pt | |
| 5,916,664 A | 6/1999 | Rudy | |
| 6,000,079 A * | 12/1999 | Dranger | A47C 4/54 425/522 |
| 6,092,249 A | 7/2000 | Kamen et al. | |
| 6,560,803 B2 | 5/2003 | Zur | |
| 8,127,373 B1 | 3/2012 | Fodemski | |
| 8,523,794 B2 | 9/2013 | Iker et al. | |
| 2002/0004120 A1 | 1/2002 | Hillier | |
| 2002/0128572 A1 | 9/2002 | Chang | |
| 2003/0009913 A1 | 1/2003 | Potter et al. | |
| 2003/0131417 A1 | 7/2003 | Roux | |
| 2003/0181990 A1 | 9/2003 | Phillips | |
| 2004/0083550 A1 | 5/2004 | Graebe | |
| 2005/0043585 A1 | 2/2005 | Datta et al. | |
| 2006/0085919 A1 | 4/2006 | Kramer et al. | |
| 2006/0174518 A1 | 8/2006 | Fogarty et al. | |
| 2009/0000037 A1 | 1/2009 | Graebe | |
| 2011/0163885 A1 | 7/2011 | Poulos et al. | |
| 2012/0054965 A1 | 3/2012 | Kummer et al. | |
| 2014/0013514 A1* | 1/2014 | Misaki | A61G 7/05769 5/710 |
| 2014/0026327 A1 | 1/2014 | Taylor | |
| 2014/0167460 A1 | 6/2014 | Prexl et al. | |
| 2015/0335167 A1 | 11/2015 | Cinquin | |
| 2016/0252110 A1 | 9/2016 | Galloway et al. | |
| 2017/0086588 A1 | 3/2017 | Zouzal et al. | |

OTHER PUBLICATIONS

Balasubramanian et al., "Robot-assisted rehabilitation of hand function" Curr. Opin. Neurol. 23(6), 2010. Available: http://journals.lww.com/co-neurology/Fulltext/2010/12000/Robot_assisted_rehabilitation_of_hand_function.19.aspx.
Birch et al., "Design of a continuous passive and active motion device for hand rehabilitation", Presented at Engineering in Medicine and Biology Society, 2008. EMBS 2008. 30th Annual International Conference of the IEEE. 2008, . DOI: 10.1109/IEMBS.2008.4650162.
Board, et al. "A comparison of trans-tibial amputee suction and vacuum socket conditions." *Prosthetics and Orthotics International*, 25(3);202-209, 2001.
Brand, "Tenderizing the Foot," *Foot & Ankle International*, 24(6); 457-461, 2003.
Bus, et al., "The Effectiveness of Footwear and Offloading Interventions to Prevent and Heal Foot Ulcers and Reduce Plantar Pressure in Diabetes: A Systematic Review," *Diabetes Metabolism Research & Reviews*, 24 (S1); 99-118, 2008.
Chantelau, et al., "How Effective is Cushioned Therapeutic Footwear in Protecting Diabetic Feet? A Clinical Study," *Diabetic Medicine*, 7(4); 355-359, 1990.
Connelly et al., "A pneumatic glove and immersive virtual reality environment for hand rehabilitative training after stroke" Neural Systems and Rehabilitation Engineering, IEEE Transactions On 18(5), pp. 551-559. 2010. DOI: 10.1109/TNSRE.2010.2047588.
Convery & Buis, "Conventional Patellar-Tendon-Bearing (PTB) Socket/Stump Interface Dynamic Pressure Distributions Recorded During the Prosthetic Stance Phase of Gait of a Trans-Tibial Amputee," *Prosthetics and Orthotics International*, 22(3);193-198, 1998.
Dargis, et al., "Benefits of a Multidisciplinary Approach in the Management of Recurrent Diabetic Foot Ulceration in Lithuania: A Prospective Study," *Diabetes Care*, 22(9); 1428-1431, 1999.
Edmonds, et al., "Improved Survival of the Diabetic Foot: The Role of a Specialized Foot Clinic," *Quarterly Journal of Medicine*, 60(232); 763-771, 1986.
Faudzi, et al., "Design and Control of New Intelligent Pneumatic Cylinder for Intelligent Chair Tool Application," 2009 IEEE/IAS International Conference on Advanced Intelligent Mechatronics, Singapore, 1909-1914, 2009.
Hagberg & Branemark, "Consequences of Non-Vascular Trans-Femoral Amputation: A Survey of Quality of Life, Prosthetic Use and Problems." *Prosthetics and Orthotics International*, 25(3); 186-194, 2001.
Haghshenas-Jaryani M, Carrigan W, Wijesundara MBJ: "Design and Development of a Novel Soft-and-Rigid Actuator System for Robotic Applications", Paper No. 47761, Proceedings of the ASME 2015 International Design Engineering Technical Conferences & Computers and Information in Engineering Conference IDETC/CIE2015 Aug. 2-5, 2015, Boston, MA, USA.
Hamanami, et al., "Finding the Optimal Setting of Inflated Air Pressure for a Multi-Cell Air Cushion for Wheelchair Persons with Spinal Cord Injury," *Acta Medica Okayama*, 58(1): 37-44, 2004.
Heo and Kim, "Power-assistive finger exoskeleton with a palmar opening at the fingerpad" Biomedical Engineering, IEEE Transactions On 61(11), pp. 2688-2697. 2014. . DOI: 10.1109/TBME.2014.2325948.
Ho, et al., "An EMG-driven exoskeleton hand robotic training device on chronic stroke subjects: Task training system for stroke rehabilitation" Presented at Rehabilitation Robotics (ICORR), 2011 IEEE International Conference On. 2011, . DOI: 10.1109/ICORR.2011.5975340.
Hume et al., "Functional range of motion of the joints of the hand," J.Hand Surg., vol. 15, No. 2, March pp. 240-243, 1990.
International Preliminary Report on Patentability in International Application No. PCT/US2014/072338 dated Jun. 28, 2016.
International Preliminary Report on Patentability Issued In Corresponding PCT Application No. PCT/US2018/028599, dated Oct. 22, 2019.
International Preliminary Report on Patentability Issued in Corresponding PCT Application No. PCT/US2017/064218, dated Jun. 4, 2019.
International Preliminary Report on Patentability Issued in Corresponding PCT Application. No. PCT/US2017/063400, dated May 28, 2019.
International Search Report and Written Opinion in International Application No. PCT/US2014/072338 dated Jun. 2, 2015.

(56) References Cited

OTHER PUBLICATIONS

International Search Report and Written Opinion Issued in Corresponding PCT Application No. PCT/US2017/064218, dated Mar. 28, 2018.
International Search Report and Written Opinion Issued in Corresponding PCT Application No. PCT/US2017/063400, dated Feb. 9, 2018.
International Search Report and Written Opinion Issued in Corresponding PCT Application No. PCT/US2018/28599, dated Aug. 1, 2018.
Kadowaki et al., "Development of Soft Power-Assist Glove and Control Based on Human Intent," Journal of Robotics and Mechatronics, vol. 23, No. 2, pp. 281-291, 2011.
Kawasaki et al., "Development of a hand motion assist robot for rehabilitation therapy by patient self-motion control" Presented at Rehabilitation Robotics, 2007. ICORR 2007. IEEE 10th International Conference On. 2007, . DOI: 10.1109/ICORR.2007.4428432.
Lavery, et al., "Shear-Reducing Insoles to Prevent Foot Ulceration in High-Risk Diabetic Patients," *Advances in Skin & Wound Care*, 25(11); 519-524, 2012.
Loureiro and Harwin. "Reach & grasp therapy: Design and control of a 9-DOF robotic neuro-rehabilitation system" Presented at Rehabilitation Robotics, 2007. ICORR 2007. IEEE 10th International Conference On. 2007, . DOI: 10.1109/ICORR.2007.4428510.
Lum et al., "Robotic approaches for rehabilitation of hand function after stroke" American Journal of Physical Medicine & Rehabilitation 91(11), 2012. Available: http://dx.doi.org/10.1097/PHM.0b013e31826bcedb. DOI: 10.1097/PHM.0b013e31826bcedb.
Polygerinos et al., "Soft robotic glove for combined assistance and at-home rehabilitation", Robotics and Autonomous Systems, 73; 135-143, 2015.
Polygerinos et al., "Towards a soft pneumatic glove for hand rehabilitation" Presented at Intelligent Robots and Systems (IROS), 2013 IEEE/RSJ International Conference On. 2013, . DOI: 10.1109/IROS.2013.6696549.
Reiber, et al., "Effect of Therapeutic Footwear on Foot Reulceration in Patients with Diabetes: A Randomized Controlled Trial," *The Journal of the American Medical Association*, 287(19); 2552-2558, 2002.
Sanders, et al., "Clinical Utility of In-Socket Residual Limb Volume Change Measurement: Case Study Results," *Prosthetics and Orthotics International*, 33(4); 378-390, 2009,.
Schabowsky et al., "Development and pilot testing of HEXORR: Hand EXOskeleton rehabilitation robot" Journal of NeuroEngineering and Rehabilitation 7(1), pp. 36. 2010. Available: http://www.jneuroengrehab.com/content/7/1/36.
Uccioli, et al., "Manufactured Shoes in the Prevention of Diabetic Foot Ulcers," *Diabetes Care*, 18(10); 1376-1378, 1995.
Ueki et al., "Development of a Hand-Assist Robot With Multi-Degrees-of-Freedom for Rehabilitation Therapy," Mechatronics, IEEE/ASME Transactions on, vol. 17, No. 1, pp. 136-146, 2012.
Ueki et al., "Development of virtual reality exercise of hand motion assist robot for rehabilitation therapy by patient self-motion control" Presented at Engineering in Medicine and Biology Society, 2008. EMBS 2008. 30th Annual International Conference of the IEEE. 2008, . DOI: 10.1109/IEMBS.2008.4650156.
Vermeulen, et al., "Trajectory Planning for the Walking Biped Lucy," *The International Journal of Robotics Research*, 25(9): 867-887, 2006.
Wege & Hommel, "Development and control of a hand exoskeleton for rehabilitation of hand injuries" Human Interaction with Machines, G. Hommel and S. Huanye, Eds. 2006, 149-157, DOI: 10.1007/1-4020-4043-1_16.

* cited by examiner

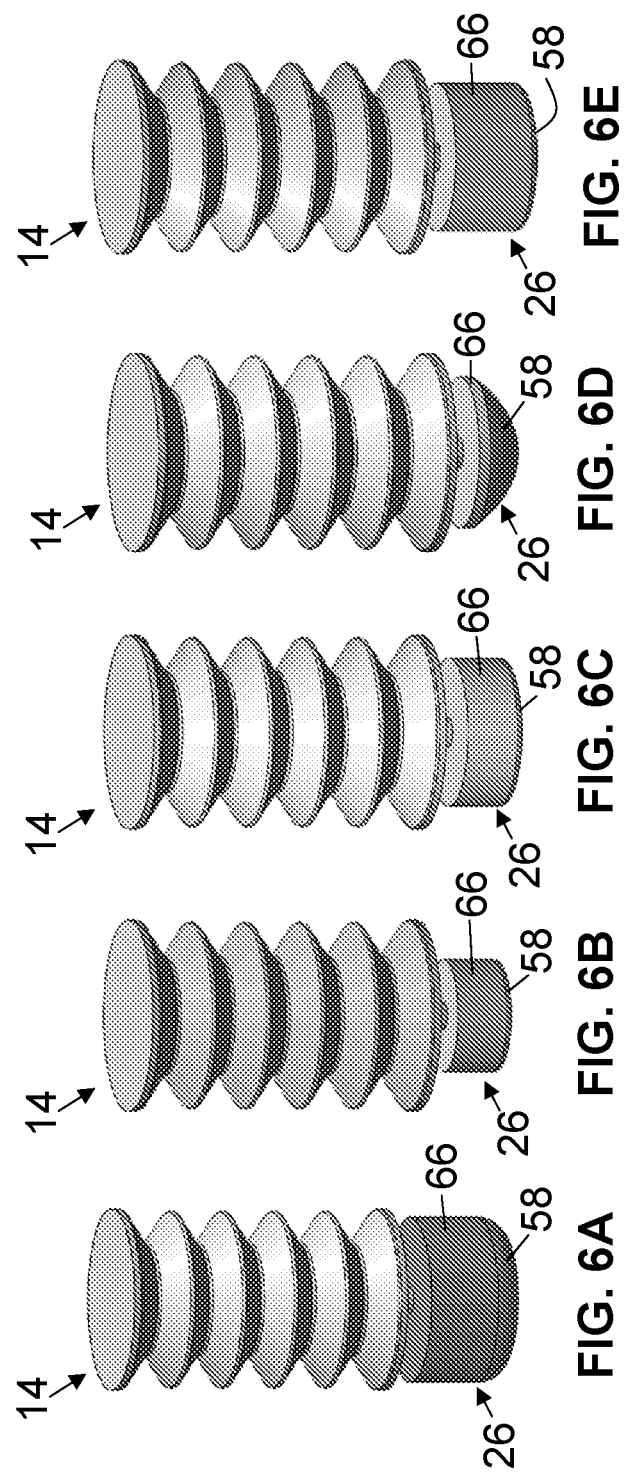

VARIABLE STIFFNESS APPARATUSES USING AN INTERCONNECTED DUAL LAYER FLUID-FILLED CELL ARRAY

CROSS-REFERENCE TO RELATED APPLICATION

This application is a national phase application under 35 U.S.C. § 371 of International Application No. PCT/US2017/064218, filed Dec. 1, 2017 which claims the benefit of priority to U.S. Provisional Patent Application No. 62/428,613 filed Dec. 1, 2016, All applications listed in this paragraph are hereby incorporated in their respective entireties.

BACKGROUND

1. Field of Invention

The present invention relates generally to cushioning apparatuses, and more specifically, but not by way of limitation, to variable stiffness apparatuses using an interconnected dual layer fluid-filled cell array.

2. Description of Related Art

Most seat cushions and other ergonomic products use urethane foam or other types of foams as a cushioning materials to reduce interface pressure. Though highly advantages due to low cost and lightweight, a well understood problem with foam based cushions is that they degrade over time, particularly, their dynamic modulus will change and become stiffer with the use over time resulting an increase of interface pressure. Alternatively, air-filled cell array has been used for making seat cushions and mattresses to avoid stiffness change over time and shown to have better interface pressure distribution. One of the most important shortcomings with this air-filled cell array technology is that a cell has to be inflated to different pressures if variable stiffness surface is required. For example, users have to inflate or deflate air cells manually to reduce or increase the interface pressure in different areas.

SUMMARY

The present apparatuses and methods relate to various application fields including seat cushion (e.g., for automotive and aircraft), ergonomic products (e.g., chairs, mattresses, mattress overlay, pillow, and/or the like), assistive medical devices, injury reduction gears, packaging, and/or the like. The present apparatuses and methods provide varying interface pressure across the surface based on pressure sensitive and pressure tolerance area of the object being in contact with the surface.

The present apparatuses and methods provide a variable stiffness across a surface using arrays of fluid-filled dual cell structures. Each dual cell structure includes at least one primary and one secondary cell which are interconnected through a channel that facilitates air, liquid, or gel transfer between the primary and secondary cells. The primary cell acts as an interfacing surface to be in contact with external objects while the secondary cell determines the stiffness and the internal pressure of the dual cell structure. When a primary cell is subjected to an external load, the fluid from the primary cell flows into the secondary cell, which has the capability of expanding to accommodate the incoming fluid to reduce overall pressure increase of the system. By changing the geometrical features as well as the constructing material of the secondary cell, the expansion characteristics of the secondary cell can be varied to achieve the desired stiffness of the dual cell structure. The geometry (e.g., size and/or shape) of the channel between the primary and secondary cell can also be used to control the reaction and recovery time of the structure to an external load. The variable stiffness at desired locations across a surface is achieved by combining dual cell structure with different stiffness.

Key advantages of the present apparatuses and methods include: stiffness changes of each bladder structure can be achieved through mechanical design by using two or more interconnected fluid (e.g., air, water, oil, gel, and other fluid) filled cell architectures; inflation and/or deflation not required, as the bladder structure is a closed system; customization abilities based on application requirements, such as, for example, type, condition, weight, and/or the like; minimal changes in stiffness over time; and customization to the desired interface pressure distribution.

Some embodiments of the present apparatuses comprise: a substrate having a first side and a second side; and a plurality of structures coupled to the substrate, where each structure comprises: a flexible first portion having a first end, a second end, and a sidewall extending between the first end and the second end, the first portion defining a first chamber; and a second portion having a first end, a second end, and a sidewall extending between the first end and the second end, the second portion defining a second chamber in fluid communication with the first chamber; where each of the plurality of structures is coupled to the substrate such that the first portion is disposed on the first side of the substrate, and the second chamber is disposed on the second side of the substrate.

In some embodiments, the substrate comprises a plurality of apertures and the plurality of structures are disposed through respective one of the plurality of apertures.

In some embodiments, the plurality of structures are configured to be coupled to a fluid source such that the fluid source can deliver fluid to the first chamber and/or the second chamber to vary internal pressures of the plurality of structures.

Some embodiments of the present apparatuses include a substrate having a first side and an opposing second side; and a plurality of structures coupled to the substrate, where each structure comprises: a flexible first portion having a first end, a second end, and a sidewall extending between the first end and the second end, the first portion defining a first chamber; and a second portion having a first end, a second end, and a sidewall extending between the first end and the second end, the second portion defining a second chamber; a medial portion extending between the first and second portions, the medial portion defining a channel in fluid communication with the first chamber and the second chamber; where each of the plurality of structures is coupled to the substrate such that each of the first and second portions is disposed on the first side of the substrate.

Some embodiments of the present apparatuses comprise: a substrate having a first side, a second side, and an aperture extending between the first side and the second side; and a structure extending through the aperture of the substrate, the structure comprising: a flexible first portion having a first end, a second end, and a sidewall extending between the first end and the second end, the first portion defining a first chamber; and a second portion having a first end, a second end, and a sidewall extending between the first end and the second end, the second portion defining a second chamber in fluid communication with the first chamber; a medial portion extending between the first and second portions, the medial portion defining a channel in fluid communication with the first chamber and the second chamber; where the medial portion is disposed in the aperture such that the first portion is disposed on the first side of the substrate, and the second portion is disposed on the second side of the substrate.

In some embodiments, pressure in the first chamber is equal to pressure in the second chamber.

In some embodiments, the first chamber and the second chamber include a liquid and/or a gas. In some embodiments, the liquid comprises a gel.

In some embodiments, the sidewall of the first portion includes a planar surface and/or a corrugated surface. In some embodiments, the first portion includes a bellows. In some embodiments, the first end of the first portion and/or the first end of the second portion includes a planar and/or rounded surface.

In some embodiments, the second portion is flexible such that compression of the first portion causes the second portion to expand. In some embodiments, the sidewall of the second portion has a thickness ranging 0.05-30 mm. In some embodiments, the thickness of the sidewall of the second portion ranges 0.05-30 mm.

In some embodiments, the second portion is rigid and includes a piston and a biasing member disposed in the second chamber, the piston being movable relative to the second portion to a first position in response to a fluid force of a fluid within the first chamber acting on the piston being greater than a biasing force of the biasing member acting on the piston and to a second position in response to the biasing force being greater than the fluid force.

In some embodiments, the first portion and/or the second portion includes a polymer. In some embodiments, the polymer comprises at least one material selected from the group consisting of: urethane, silicone, latex, neoprene, isoprene, and nylon.

Some embodiments of the present methods comprise: compressing a first portion of a structure coupled a substrate, the structure comprising: a flexible first portion having a first end, a second end, and a sidewall extending between the first end and the second end, the first portion defining a first chamber; and a second portion having a first end, a second end, and a sidewall extending between the first end and the second end, the second portion defining a second chamber in fluid communication with the first chamber; where each of the plurality of structures is coupled to the substrate such that the first portion is disposed on the first side of the substrate.

In some embodiments, one or more of the plurality of structures is coupled to the substrate such that the second chamber is disposed on the second side of the substrate. In some embodiments, one or more of the plurality of structures is coupled to the substrate such that the second chamber is disposed on the first side of the substrate.

In some embodiments, compressing the first portion causes the first chamber to compress. In some embodiments, compressing the first chamber causes the second chamber to expand.

In some embodiments, the second portion is rigid and includes a piston and a biasing member disposed within the second chamber, and where compressing the first portion causes the piston to move relative to the second portion against a force of the biasing member acting on the piston.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Further, an apparatus or system that is configured in a certain way is configured in at least that way, but it can also be configured in other ways than those specifically described.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 6A-6E are perspective views of variations of a second portion of the bladder structures of FIGS. 3 and 4 that may be suitable for use in some embodiments of the present apparatuses.

DETAILED DESCRIPTION OF ILLUSTRATIVE EMBODIMENTS

Figure 2:
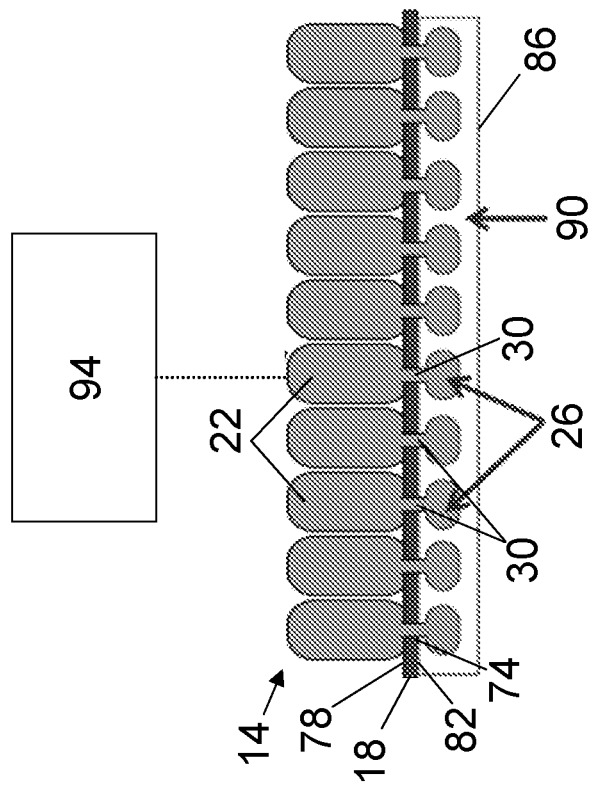
FIG. 2 is a cross-sectional view of the apparatus of FIG. 1, taken along line 2-2 of FIG. 1.
Figure 1:
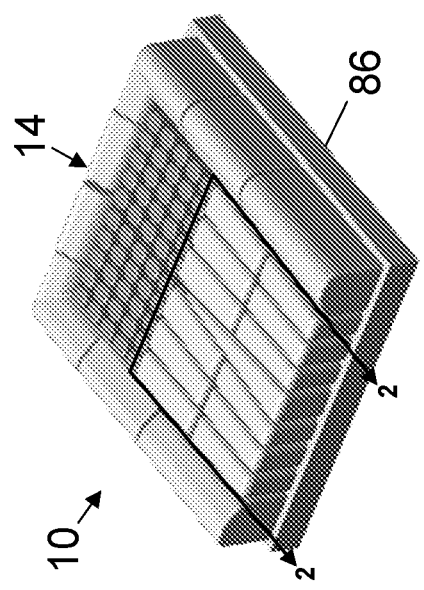
FIG. 1 is a perspective view of a first embodiment of the present apparatuses.

FIGS. 1 and 2 depict a first embodiment 10 of the present apparatuses. Apparatus 10 can be used a weight-bearing component in, for example, a seat cushion (e.g., FIG. 2), a shoe insole, and/or the like. Apparatus 10 comprises a plurality of support bladders 14 coupled to a substrate 18.

Each bladder 14 includes a first portion 22, a second portion 26, and a third (e.g., medial) portion 30 extending between the first and second portions. First portion 22 of each bladder 14 defines a first chamber 34. For example, first chamber 34 of first portion 22 is defined by a cap 42, a base 46, and a sidewall 50 extending between the cap and the base. Second portion 26 of each bladder defines a second chamber 54. For example, second chamber 54 of second portion 26 is bounded by a cap 58, a base 62, and a sidewall 66 extending between the cap and the base. In this embodiment, third portion 30 defines a channel 70 configured to provide fluid communication between first chamber 34 and second chamber 54.

As shown, substrate 18 is substantially flat and includes a plurality of apertures 74 extending through the substrate (e.g., from a first side 78 of the substrate to a second side 82 of the substrate that is opposite the first side), each of which are sized to fit at least a portion of a bladder (e.g., 14) through the aperture. Each bladder 14 can be coupled to substrate 18 such that third portion 30 the bladder is disposed in an aperture 74 of the substrate and, for example, first portion 22 of the bladder is disposed on first side 78 of the substrate and second portion 26 of the bladder is disposed on second side 82 of the substrate. Substrate 18 can be coupled to a (e.g., rigid) base 86 (e.g., on second side 82 of the substrate) such that the substrate and the housing cooperate to define a chamber 90.

Each bladder 14 (e.g., first chamber 34, second chamber 54, and/or channel 70) is configured to be filled with fluid such that pressure in the first chamber is equal to pressure in the second chamber. When first portion 22 of bladder 14 is subjected to an external loading, the first portion compresses, which results in a decrease in volume of first chamber 34 and an increase of pressure within the first chamber. Such pressure changes of first portion 22 can cause fluid in the first portion to be displaced to second portion 26. In turn, in this embodiment, second portion 26 can expand such that second chamber 54 can increase in volume to accommodate incoming fluid from first chamber 34. As shown, second portion 26 of each bladder 14 can be disposed within chamber 90 such that the second portion can expand with the chamber.

Suitable fluids for use in the present bladders 14 include a compressible fluid (e.g., air), a liquid (e.g., hydraulic fluid, water, oil, gel), and/or the like. Such fluids may be shear-thinning or shear-thickening liquids, which may be selected based in part upon a desired expansion and/or compression characteristic of bladder 14, as discussed in further detail below.

In some embodiments, where apparatus 10 is used as a component of a seat cushion (e.g., in a vehicle) or a shoe insole, one or more of bladders 14 can be configured to be coupled to a fluid source 94 such that, while in use, the fluid source can deliver fluid to first chamber 34 and/or second chamber 54 of one or more of the bladders to vary an internal pressures of bladders, based in part upon the terrain, speed of a travel (e.g., of the vehicle or shoe), weight of the user, and/or the like. For example, to this end, apparatus 10 can comprise a valve system to fill or remove fluid from one or more of bladders 14.

Each bladder 14 (e.g., first portion 22 and/or second portion 26) can be configured to exhibit a particular expansion and/or compression characteristic to accommodate application needs such as, for example, total displacement (e.g., of the first portion and/or the second portion in an axial direction), weight bearing requirements, and/or the like. Such expansion and/or compression characteristics include a magnitude of volume change (e.g., of first chamber 34 and/or second chamber 54 of each bladder 14), rate of volume change (e.g., of the first chamber and the second chamber of the bladder), damping characteristics, stiffness characteristics, and/or the like. Design parameters that at least partially determine the expansion and/or compression characteristics of each bladder 14 can include geometrical features (e.g., dimensions, shape, and/or the like) and material properties (modulus of rigidity, modulus of elasticity, hardness, and/or the like).

In this embodiment, one or more of the dimensions of first portion 22, second portion 26, and/or third portion 30 of each bladder 14 can be a contributing factor to change the expansion and/or compression characteristics of the bladder.

Figure 4:
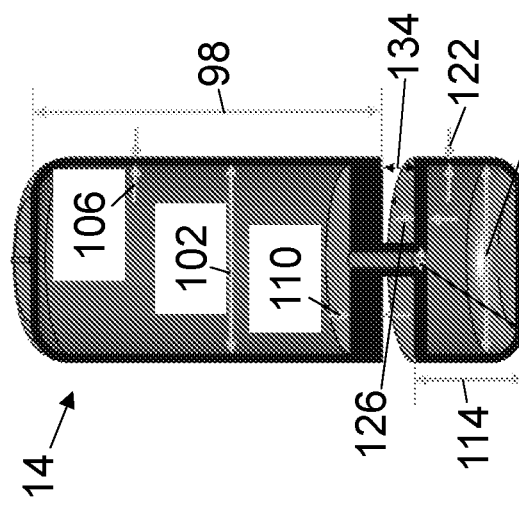
FIGS. 3 and 4 are cross sectional views, respectively, of first and second embodiments of bladder structures that are suitable for use in some embodiments of the present apparatuses.
Figure 3:
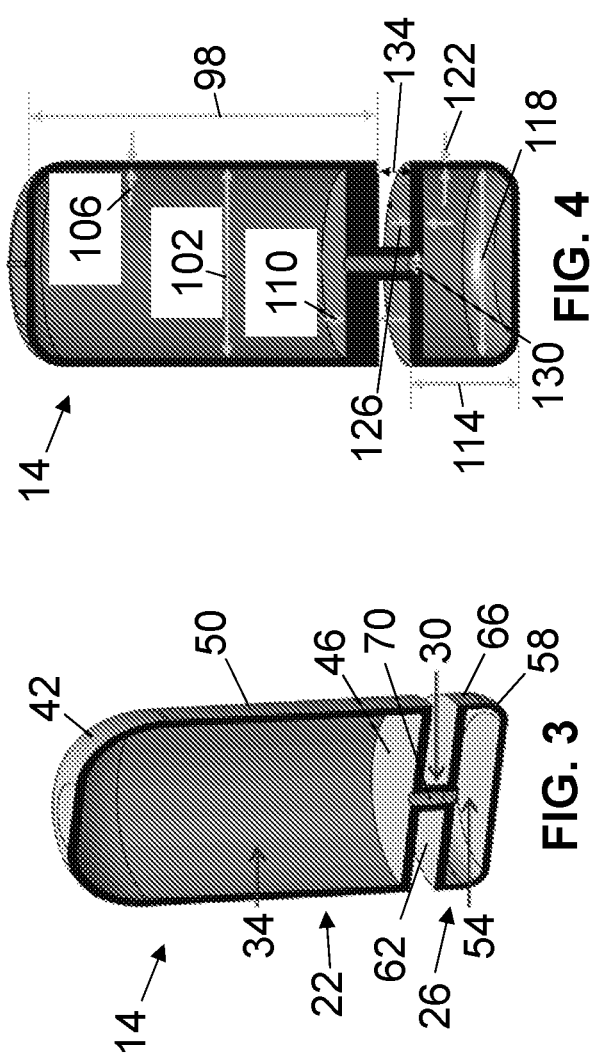

As shown in FIG. 4, first portion 22 includes a height 98, an inner diameter 102, a sidewall thickness 106, and a base thickness 110. In this embodiment, sidewall thickness 106 of first portion 22 can be substantially between any two of the following: 0.05, 0.1, 0.5, 1.0, 2.0, 3.0, 4.0, 5.0, 10, 15, 20, 25, and 30 millimeters (mm). Height 98 of first portion 22 can be substantially between any two of the following: 0.5, 1.0, 2.0, 3.0, 4.0, 5.0, 10, 15, 20, 25, 50, and 75 centimeters (cm). Inner diameter 102 of first portion 22 can be substantially between any two of the following: 1.0 mm, 2.0 mm, 3.0 mm, 4.0 mm, 5.0 mm, 10 mm, 50 mm, 1 cm, 5 cm, 10 cm, 15 cm, 20 cm, 25 cm, 50 cm and 75 cm. Base thickness 110 of first portion 22 can be substantially between any of the following: 0.05, 0.1, 0.5, 1.0, 2.0, 3.0, 4.0, 5.0, 10, 15, 20, 25, and 30 mm.

Second portion 26 includes a height 114, an inner diameter 118, a sidewall thickness 122, and a base thickness 126. Sidewall thickness 112 of second portion 26 can be substantially between any two of the following: 0.05, 0.1, 0.5, 1.0, 2.0, 3.0, 4.0, 5.0, 10, 15, 20, 25, and 30 mm. Height 114 of second portion 26 can be substantially between any two of the following: 0.2, 0.4, 0.6, 0.8, 1.0, 2.0, 3.0, 4.0, 5.0, 10, 15, 20, 25, and 30 mm. Inner diameter 118 of second portion 26 can be substantially between any two of the following: 1.0 mm, 2.0 mm, 3.0 mm, 4.0 mm, 5.0 mm, 10 mm, 50 mm, 1 cm, 5 cm, 10 cm, 15 cm, 20 cm, 25 cm, 50 cm, and 75 cm. Base thickness 126 of second portion 26 can be substantially between any of the following: 0.05, 0.1, 0.2, 0.4, 0.6, 0.8, 1.0, 2.0, 3.0, 4.0, 5.0, 10, 15, 20, 25, and 30 mm.

Third portion 30 includes an inner diameter 130 and a length 134 measured between base 46 of first portion 22 and base 62 of second portion 26. Inner diameter 130 and/or length 134 of third portion 30 can be substantially between any two of the following: 0.1, 0.5, 1.0, 2.0, 3.0, 4.0, 5.0, 10, 15, 20, 25, 30, 35, 40, 45, and 50 mm. For example, by increasing inner diameter 130 of third portion 30, bladder 14 exhibits increased response and recovery times. For further example, by increasing length 134 of third portion 30, bladder 14 exhibits decreased response and reaction times. Inner diameter 130 of third portion 30 can be substantially uniform (e.g., cylindrical). In some embodiments, an inner diameter (e.g., 130) of a third portion (e.g., 30) can be non-uniform (e.g., conical). In some further embodiments, a channel (e.g., 70) of a third portion (e.g., 30) can be non-circular.

In this embodiment, the material included in first portion 22, second portion 26, and/or third portion 30 of each bladder 14 can be a contributing factor to change the expansion and/or compression characteristics of the bladder. For example, first portion 22, second portion 26, and/or third portion 30 of each bladder 14 can include any appropriate material that is flexible and/or resilient such that compression of the first portion causes the second portion to expand. Appropriate materials include, for example, non-permeable fabric materials, elastic (e.g., including hyperelastic) materials, such as polymers (e.g., urethane, silicone, isoprene, neoprene, latex rubber, nylon, and/or the like), and/or the like.

In this embodiment, the shape of first portion 22, second portion 26, and/or third portion 30 of each bladder 14 can be a contributing factor to change the expansion and/or compression characteristics of the bladder. For example, referring now to FIGS. 5A-5F, shown therein are additional embodiments of the present support bladders.

As shown, sidewall 50 of first portion 22 can include a continuous outer profile extending between base 46 and cap 42. In reference to FIGS. 5A-5C, sidewall 50 of first portion 22 of one or more bladders 14 can include a rounded surface such that the first portion has a lateral cross-section having a circular, elliptical, or otherwise rounded shape. Similarly, in reference to FIGS. 5A and 5D-5F, sidewall 66 of second portion 26 of one or more bladders 14 can include a rounded surface such that the second portion has a lateral cross-section having a circular, elliptical, or otherwise rounded shape.

Figures 5A, 5B, 5C, 5D, 5E, 5F:
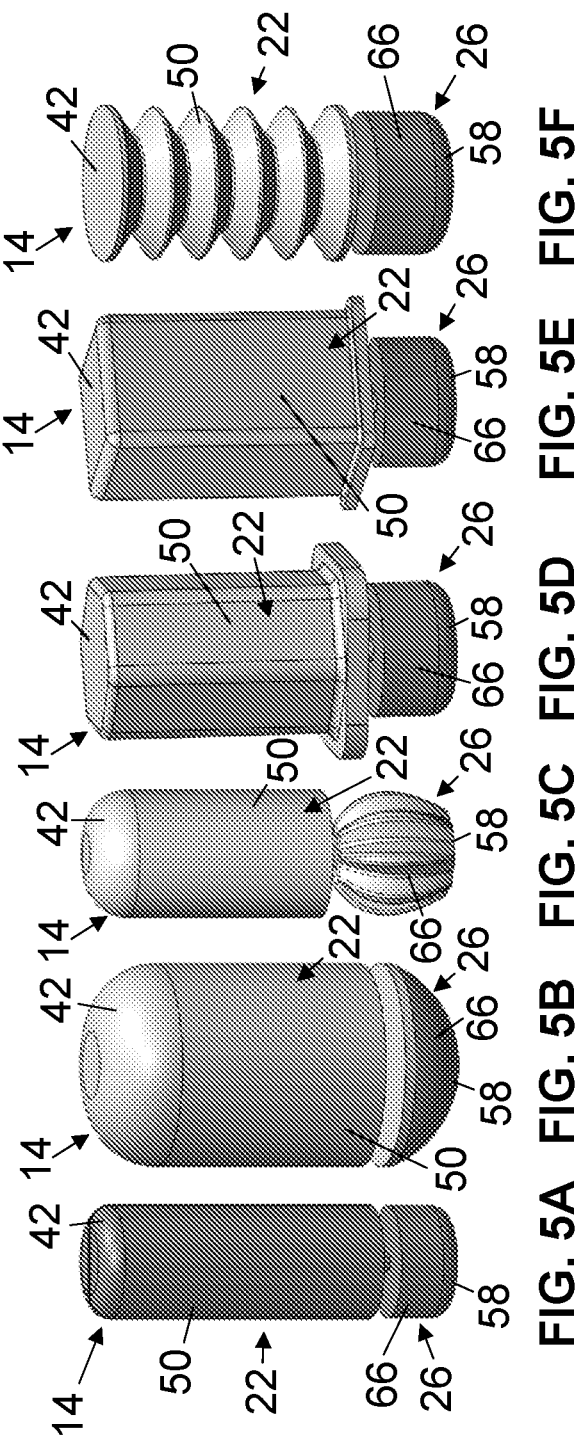
FIGS. 5A-5F are perspective views of variations on the bladder structures of FIGS. 3 and 4 that may be suitable for use in some embodiments of the present apparatuses.

In reference to FIGS. 5D and 5E, sidewall 50 of first portion 22 can include one or more planar surfaces such that, for example, the first portion has a lateral cross-section having a triangular, square (e.g., FIG. 5E), rectangular, pentagonal, hexagonal (e.g., FIG. 5D), or otherwise polygonal shape. Similarly, sidewall 66 of second portion 26 of one or more bladders 14 can include one or more planar surfaces such that, for example, the second portion has a lateral cross-section having a triangular, square, rectangular, pentagonal, hexagonal, or otherwise polygonal shape. As shown, an edge between one or more planar surfaces (e.g., 50) may be rounded (e.g., FIGS. 5D and 5E). In other embodiments, an edge between one or more planar surfaces (e.g., 50) may be sharp.

First portion 22 and/or second portion 26 of one or more bladders 14 can include a repeating profile (e.g., repeating circumferentially and/or axially). For example, in reference to FIG. 5C, second portion 26 includes a circumferentially repeating profile in the form of corrugations. In reference to FIG. 5F, for example, first portion 22 includes an axially repeating profile in the form of bellows.

Cap 42 of first portion 22 and/or cap 58 of second portion 26 can include any appropriate shape to achieve a desired contact surface area, frictional and thermal characteristics, and/or the like. Cap 42 of first portion 22 can include a rounded portion, as shown in FIGS. 5A-5C. Cap 42 of first portion 22 can (e.g., also) include a planar portion, as shown in FIGS. 5A-5F. Similarly, cap 58 of second portion can include a rounded portion, as shown in FIGS. 5A, 5B, and 5D-5F, and/or a planar portion.

EXAMPLES

Figure 7A:
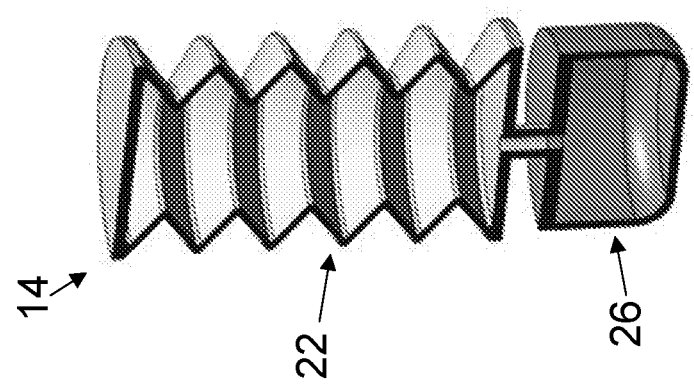
FIGS. 7A-7C are first, second, and third cross sectional views of the embodiment of the bladder structure shown in FIG. 6A.
Figure 7B:
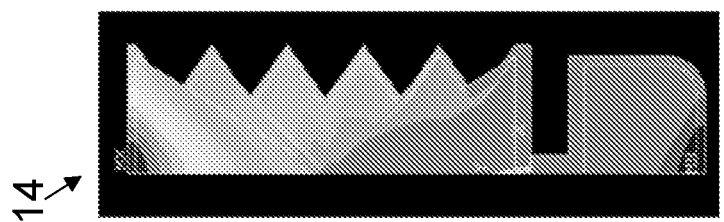
Figure 7C:
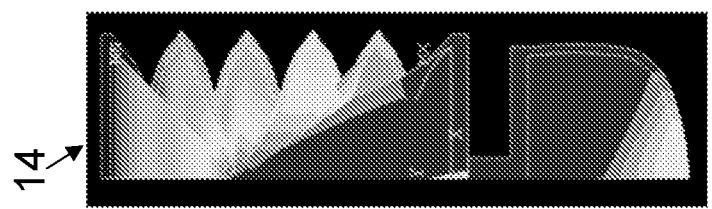

Finite Element Analysis (FEA) simulations were performed using configurations shown in FIGS. 6A-6E to show the internal pressure changes with regard to geometrical features and materials properties of second portion 26. As an example, a simulation (e.g., using FEA software ANSYS®) was performed of bladder 14 with first portion 22 having a below-shaped sidewall 50, and the bladder having polyurethane (e.g., PMC724™) with a shore hardness of 25A. FIGS. 7A and 7B show bladder 14 in a first position (e.g., before deformation) and FIG. 7C shows the bladder in a second position (e.g., while axially displacing cap 42 by 5 mm towards base 46). As shown in FIG. 7C, in the second position, second portion 26 of bladder 14 expands in response to the compression of first portion 22.

Figure 8:
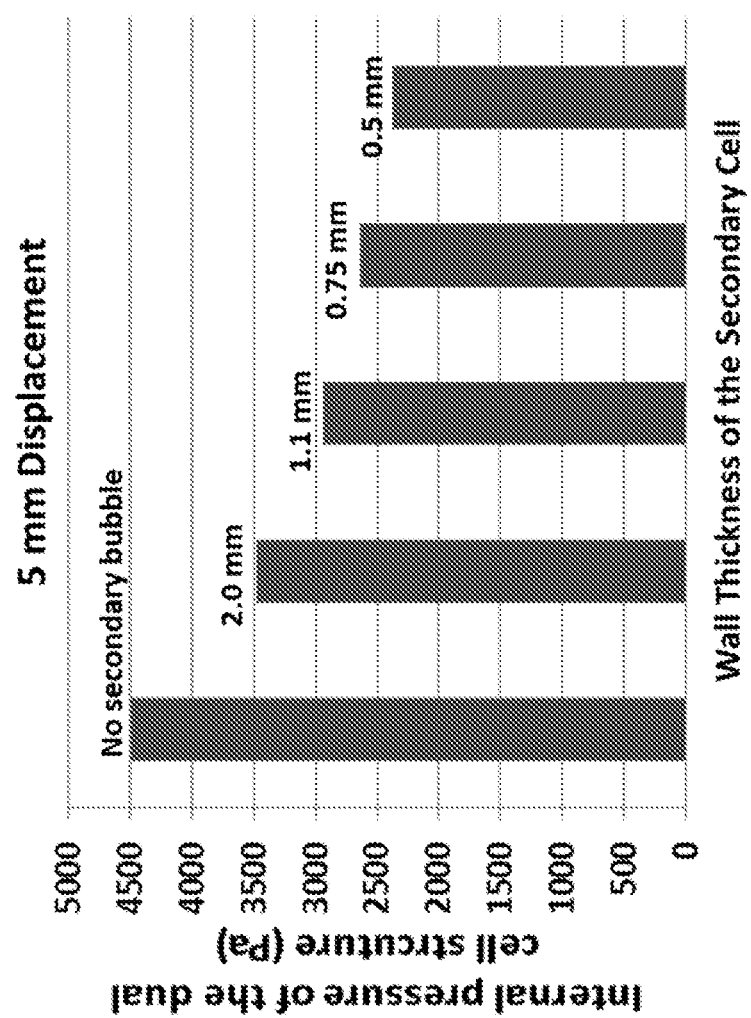
FIG. 8 is a graphical representation of internal pressure versus wall thickness of a second portion of the present bladder structures.
Figure 9:
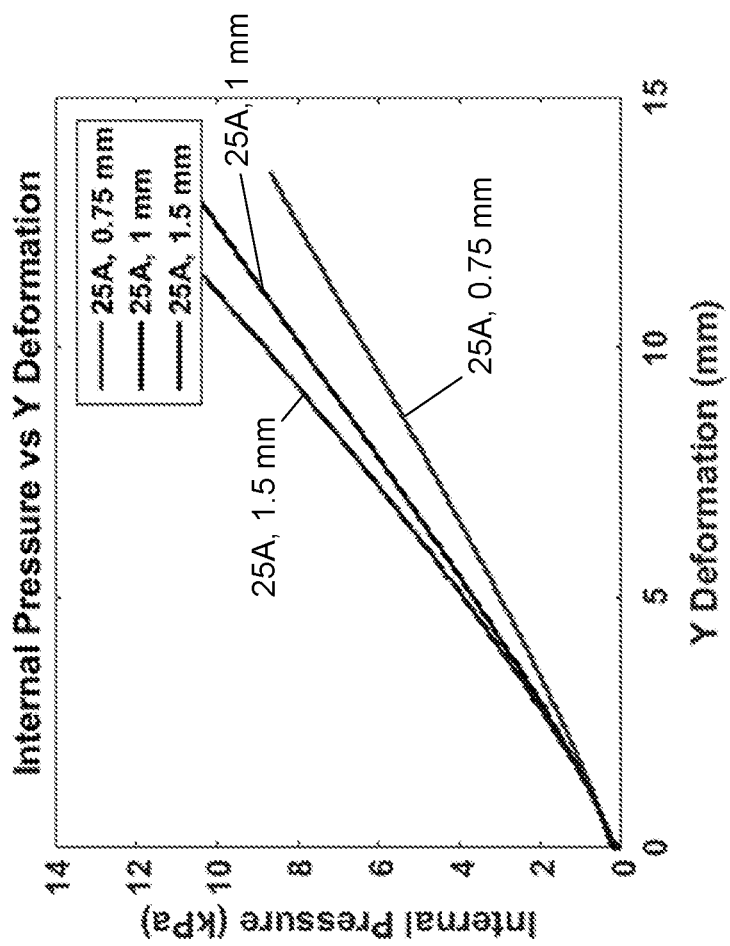
FIG. 9 is a graphical representation of internal pressure versus deformation in an axial direction.
Figure 10:
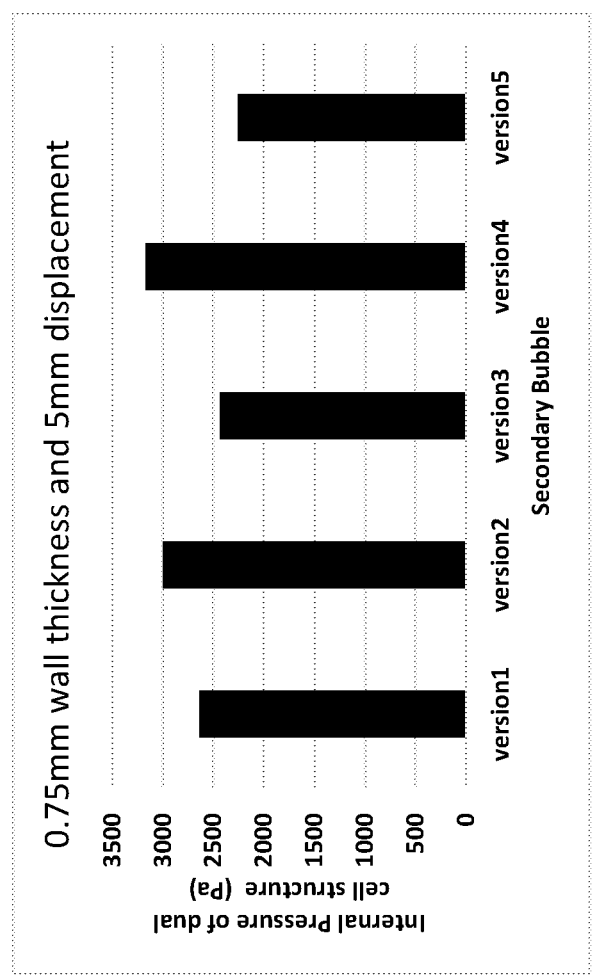
FIG. 10 is a graphical representation of internal pressure versus various sizes and/or shapes of the second portion shown in FIGS. 6A-6E, respectively.
Figure 11:
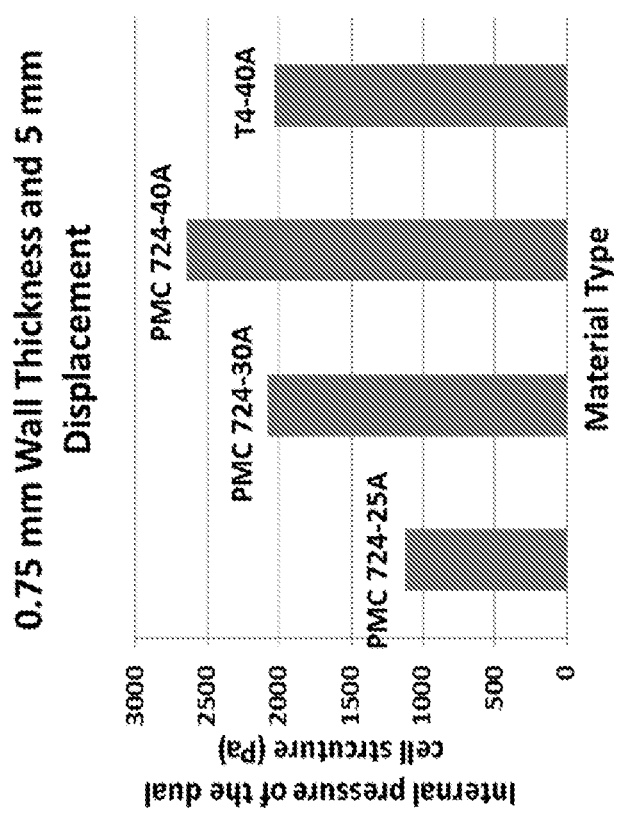
FIG. 11 is a graphical representation of internal pressure versus material type.
Figure 12:
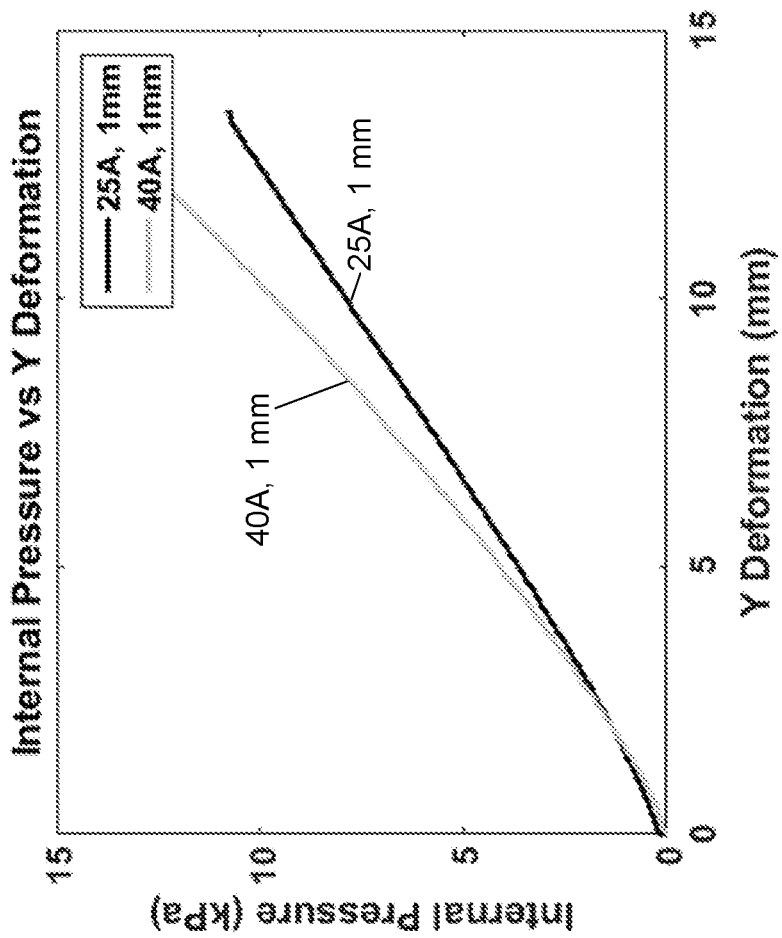
FIG. 12 is a graphical representation of internal pressure versus deformation in an axial direction for various hardnesses of the same material.

For the next set of simulations, various materials and geometrical features of second portion 26 were selected to show the effect on expansion and compression characteristics and the distribution of pressure within bladder 14. Pressure within bladder 14 can be a measure of stiffness because the pressure within the bladder can be correlated to the stiffness of the bladder. For these simulations, the initial pressure within bladder 14, geometrical features of first portion 22, and the applied total axial displacement (e.g., 5 mm) of cap 42 were kept equal. For second portion 26 of bladder 14, wall thickness 122, shape of the second portion, and materials used in the second portion were varied. FIG. 8 shows the simulation results of the effect of a change of wall thickness 122 of second portion 26 on internal pressure of bladder 14 in a comparison to a bladder without a second portion (e.g., 26). FIG. 8 shows that, by providing a second portion (e.g., 26) and by providing different wall thicknesses (e.g., 122) to the second portion, the pressure, and thus, the stiffness, of a bladder (e.g., 14) can change. This result is further supported by experimental data presented in FIG. 9, which shows the internal pressure of a bladder (e.g., 14) with respect to the vertical deformation at different wall thicknesses (e.g., 122) of second portion (e.g., 26). FIG. 10 shows the effect of the size and shape of a second portion (e.g., 26), as shown in FIGS. 6A-6E (e.g., which correspond to versions 1-5, respectively), of a bladder (e.g., 14) on the internal pressure, thereby indicating that size and/or shape of the second portion can be varied to change the expansion and/or compression characteristics of the bladder. FIG. 11 shows simulation results for a bladder (e.g., 14) having different materials, where the geometrical features and displacement condition (e.g., 5 mm axial compression) are equal. The simulation results in FIG. 11 are further supported by the experimental results shown in FIG. 12, which shows the deformation of a bladder (e.g., 14) having urethane rubber (e.g., PMC724™) with a first hardness number (e.g., 25A) and a second, higher, hardness number (e.g., 40A). Thus, as illustrated above, material selection for second portion (e.g., 26) of a bladder (e.g., 14) is an important consideration for modifying the expansion and/or compression characteristics of the bladder.

Figure 13:
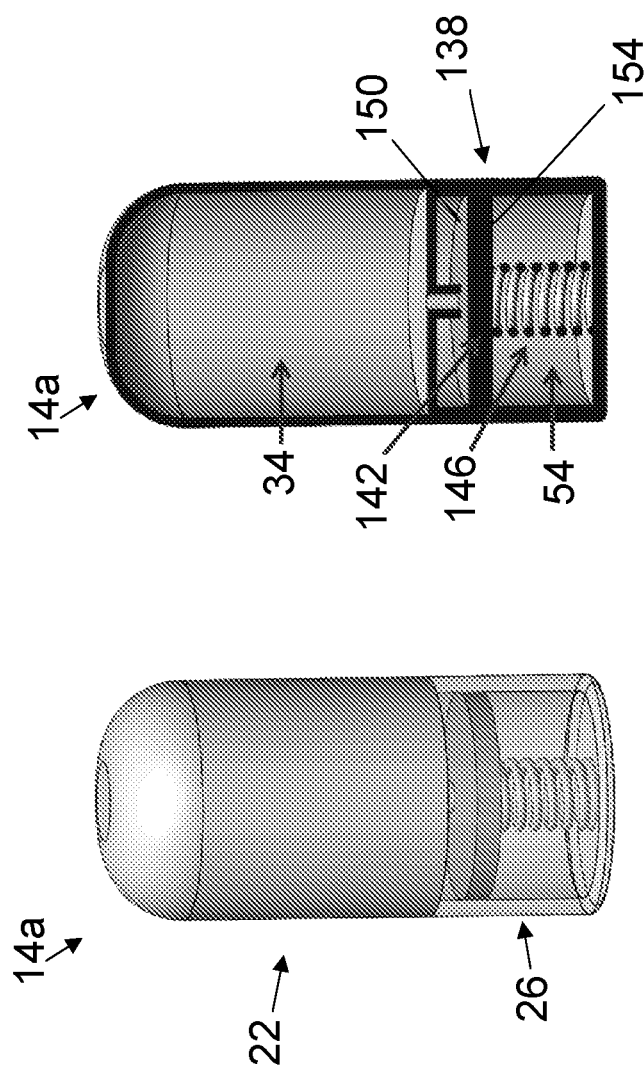
FIGS. 13A and 13B are perspective and cross sectional views, respectively, of an additional embodiment of the bladder structure that may be suitable for use in some embodiments of the present apparatuses.
Figure 14:
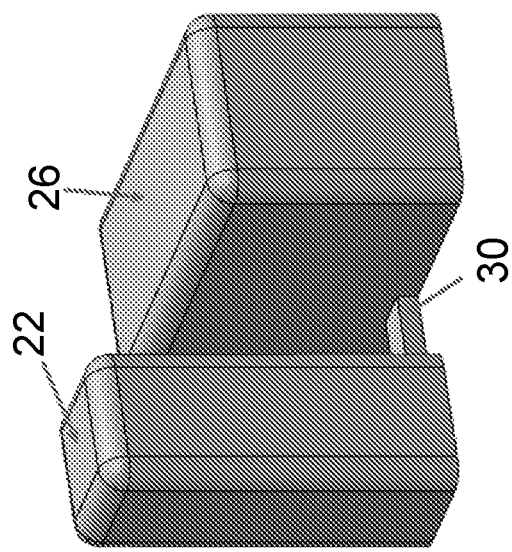
FIG. 14 is a perspective view of an additional embodiment of the bladder structure that may be suitable for use in some embodiments of the present apparatuses.
Figure 15:
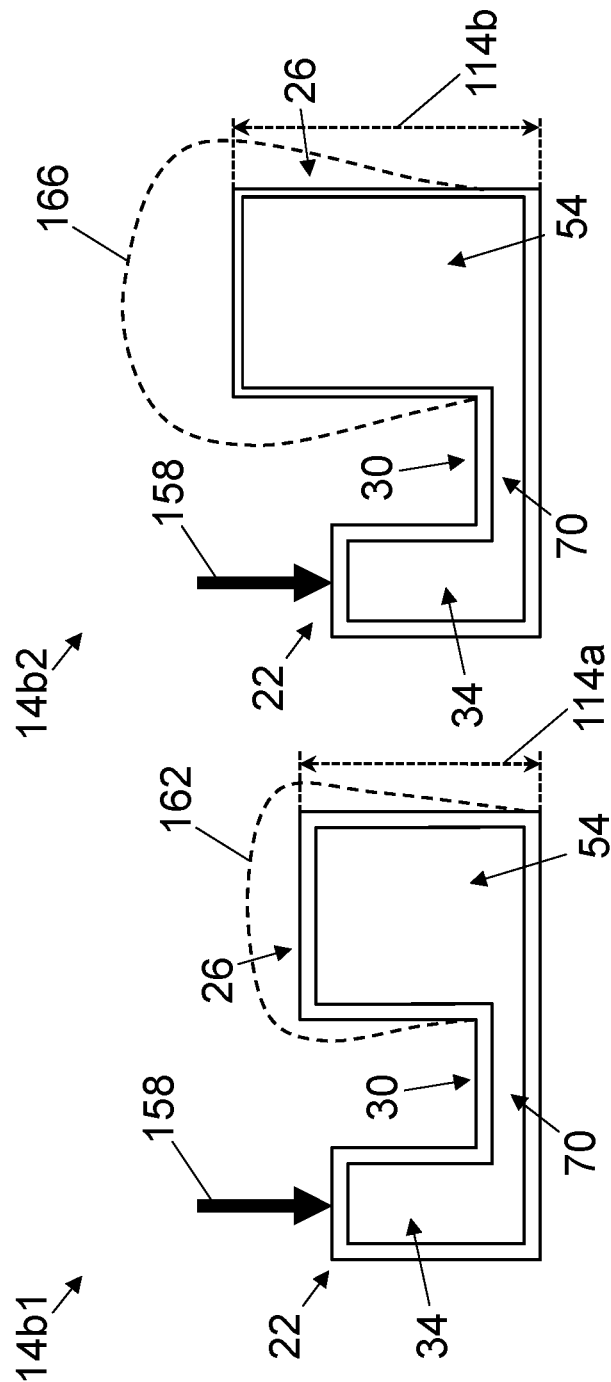
FIGS. 15A and 15B are side cross sectional views of the bladder structure of FIG. 14, shown with a second portion having a first and second size, respectively.

Referring now to FIGS. 13A and 13B, shown therein and designated by the reference numeral 14a is a second embodiment of the present bladders. Bladder 14a may be substantially similar to bladder 14, with the primary exceptions described below.

In this embodiment, second portion 26 of bladder 14 does not expand. Instead, second portion 26 includes an expansion mechanism 138 within second chamber 54 to accommodate incoming fluid from first portion 22 to the second portion. For example, in this embodiment, second portion 26 is substantially rigid and includes a piston 142 and a biasing member 146 disposed within second chamber 54. Piston 142 is movable (e.g., relative to second portion 26) in response to a fluid force of a fluid within first chamber 34 acting on a first side 150 of the piston being greater or less than a biasing force of the biasing member plus a fluid force acting on a second side 154 of the piston. For example, when a load is applied to first portion 22 of bladder 14, increased internal pressure can initiate fluid flow from the first portion to second portion 26, thereby causing piston 142 to compress biasing member 146 when the fluid force acting on first side 150 of the piston is greater than both the biasing force and the fluid force acting on second side 154 of the piston. In some embodiments where a biasing member (e.g., 146) comprises a spring, the spring constant of the spring effectively dictates the displacement of a piston (e.g., 142), and thereby dictate the ultimate stiffness of a bladder (e.g., 14).

Figure 16:
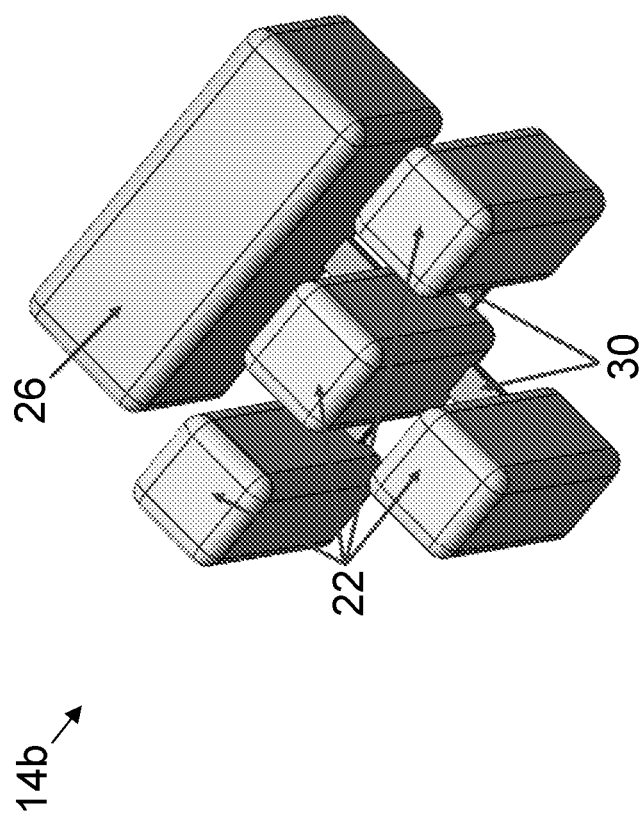
FIG. 16 is a perspective view of the bladder structure of FIG. 14, shown with a plurality of first portions.
Figure 17:
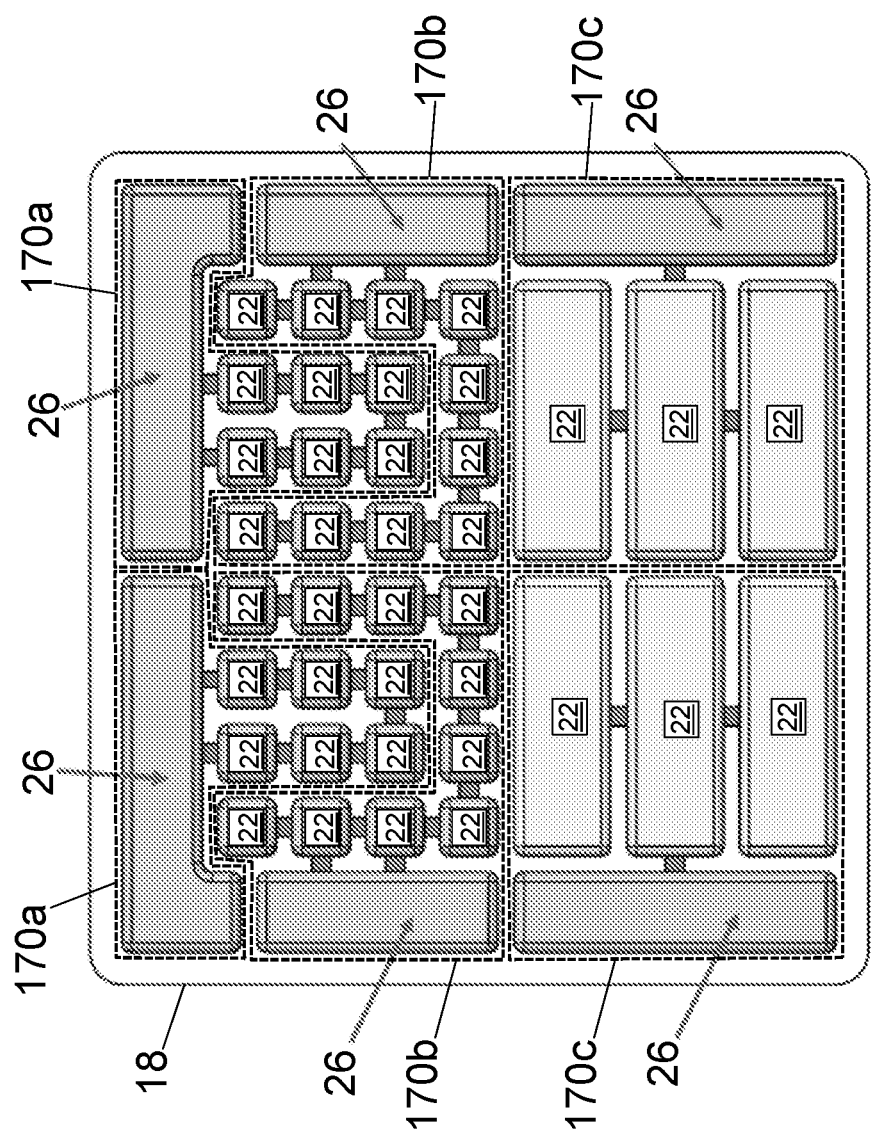
FIG. 17 is a top view of an embodiment of the present apparatuses having a plurality of the bladder structures of FIG. 14.

Referring now to FIGS. 14-17, shown therein and designated by reference numeral 14b is a third embodiment of the present bladders. Bladder 14b may be substantially similar to bladder 14, with the primary exception that both first portion 22 and second portion 26 of bladder 14b are disposed on a single side (e.g., 78) of substrate 18 (FIG. 17). That is, first chamber 34 and second chamber 54 each extend above first side 78 of substrate 18. Each bladder 14b may be coupled to substrate 18 by a bonding material (e.g., an adhesive), fastener, and/or the like.

Similar to bladder 14, when first portion 22 of bladder 14b is subjected to an external load, the first portion compresses, which results in a decrease in volume of first chamber 34 and an increase of pressure within the first chamber. Such pressure changes of first portion 22 of bladder 14b can cause fluid in first chamber 34 to be displaced to second chamber 54 via channel 70. In turn, in this embodiment, second portion 26 expands such that second chamber 54 increases in volume to accommodate incoming fluid from first chamber 34.

Similar to bladder 14, bladder 14b can be configured to exhibit the particular expansion and/or compression characteristics discussed herein. As an illustrative example, FIG. 15A shows a first bladder 14b1 comprising second portion 26 having a first height 114a and FIG. 15B shows a second bladder 14b2 comprising second portion 26 having a second height 114b greater than the first height. Second portion 26 of first bladder 14b1 comprises a sidewall thickness (e.g., 122) that is greater than a wall thickness (e.g., 122) of second portion 26 of second bladder 14b2. Second portion 26 of first bladder 14b1 and second portion 26 of second bladder 14b2 are otherwise identical (e.g., each comprise the same material and cross-sectional shape). First portion 22 and third portion 30 of each of first and second bladders 14b1, 14b2 are identical (e.g., each comprise the same height, wall thickness, material, and cross-sectional shape). Thus, in response to an equal load 158 exerted on first portion 22 of each of first and second bladders 14b1 and 14b2, second portion 26 of the second bladder exhibits greater expansion than second portion 26 of the first bladder (e.g., compare dotted line 162, showing expansion of the first portion of the first bladder, to dotted line 166, showing expansion of the first portion of the second bladder). As a result, the pressure within second chamber 54 of second bladder 14b2 may be less than the pressure within second chamber 54 of first bladder 14b1. Thus, the lower the pressure within a chamber (e.g., 54), the lower the stiffness of a bladder (e.g., 14b2).

As shown in FIG. 16, each bladder 14b can have one or more first portions 22 coupled to one or more second portions 26 via one or more third portions 30 in order for the bladders to exhibit the particular expansion and/or compression characteristics discussed herein. One or more first portions 22 can have dimensions, cross-sectional shapes, and/or materials that differ from one or more other first portions and/or one or more second portions 26. Referring additionally to FIG. 17, bladders 10b can be disposed on substrate 18 such that an apparatus (e.g., 10) comprises zones (e.g., 170a, 170b, 170c) having different expansion and/or compression characteristics.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An apparatus comprising:
a substrate having a first side and a second side; and
a plurality of structures coupled to the substrate, where each structure comprises:
   a flexible first portion having a first end, a second end, and a sidewall extending between the first end and the second end, the first portion defining a single first chamber; and
   a second portion having a first end, a second end, and a sidewall extending between the first end and the second end, the second portion defining a single second chamber in fluid communication with the first chamber,
where each of the plurality of structures is coupled to the substrate such that the first portion is disposed on the first side of the substrate, and the second chamber is disposed on the second side of the substrate, and
where for each structure the first portion of the structure and the second portion of the structure are not in fluid communication with any other structures of the plurality of structures.

2. The apparatus of claim 1, where the substrate comprises a plurality of apertures and each of the plurality of structures are disposed through a respective one of the plurality of apertures.

3. The apparatus of claim 1, where the plurality of structures are each configured to be coupled to a fluid source such that the fluid source can deliver fluid to the first chamber and/or the second chamber to vary internal pressures of the plurality of structures.

4. The apparatus of claim 1, where pressure in the first chamber is equal to pressure in the second chamber.

5. The apparatus of claim 1, where the first chamber and the second chamber include a liquid.

6. The apparatus of claim 5, where the liquid comprises a gel.

7. The apparatus of claim 1, where the sidewall of the first portion includes a planar surface and/or a corrugated surface.

8. The apparatus of claim 1, where the first portion forms a bellows.

9. The apparatus of claim 1, where the first end of the first portion and/or the first end of the second portion includes a planar and/or rounded surface.

10. The apparatus of claim 1, where the second portion is flexible such that compression of the first portion causes the second portion to expand.

11. The apparatus of claim 10, where the sidewall of the second portion has a thickness ranging from 0.05-30 mm.

12. The apparatus of claim 1, where the second portion is rigid and includes a piston and a biasing member disposed in the second chamber, the piston being movable relative to the second portion to a first position in response to a fluid force of a fluid within the first chamber acting on the piston being greater than a biasing force of the biasing member acting on the piston and to a second position in response to the biasing force being greater than the fluid force.

13. The apparatus of claim 1, where the first portion and/or the second portion includes a polymer.

14. The apparatus of claim 13, where the polymer comprises at least one material selected from the group consisting of: urethane, silicone, latex, neoprene, isoprene, and nylon.

15. An apparatus comprising:
a substrate having a first side and an opposing second side; and
a plurality of structures coupled to the substrate, where each structure comprises:
   a flexible first portion having a first end, a second end, and a sidewall extending between the first end and the second end, the first portion defining a single first chamber; and
   a second portion having a first end, a second end, and a sidewall extending between the first end and the second end, the second portion defining a single second chamber;
   a medial portion extending between the first and second portions, the medial portion defining a single channel in fluid communication with the first chamber and the second chamber;
where each of the plurality of structures is coupled to the substrate such that each of the first and second portions is disposed on the first side of the substrate, and
where for each structure the first portion of the structure and the second portion of the structure are not in fluid communication with any other structures of the plurality of structures.

16. An apparatus comprising:
a substrate having a first side, a second side, and an aperture extending between the first side and the second side; and
a structure extending through the aperture of the substrate, the structure comprising:
   a flexible first portion having a first end, a second end, and a sidewall extending between the first end and the second end, the first portion defining a single first chamber; and
   a second portion having a first end, a second end, and a sidewall extending between the first end and the second end, the second portion defining a single second chamber in fluid communication with the first chamber;
   a medial portion extending between the first and second portions, the medial portion defining a single channel in fluid communication with the first chamber and the second chamber;
   where the medial portion is disposed in the aperture such that the first portion is disposed on the first side of the substrate, and the second portion is disposed on the second side of the substrate, where the first chamber and the second chamber include a liquid.

* * * * *